United States Patent
Forgy

(10) Patent No.: US 6,595,011 B1
(45) Date of Patent: Jul. 22, 2003

(54) WATER COOLED AIR CONDITIONER

(75) Inventor: Charles L. Forgy, Dennison, TX (US)

(73) Assignees: Linda Forgy Chaney, Dallas, TX (US); Charles Lanny Forgy, Pittsburgh, PA (US); Jessie Helen Forgy, Denison, TX (US)

( * ) Notice: Subject to any disclaimer, the term of this patent is extended or adjusted under 35 U.S.C. 154(b) by 0 days.

(21) Appl. No.: 10/139,087

(22) Filed: May 2, 2002

(51) Int. Cl.[7] ............................................. F25D 17/06
(52) U.S. Cl. .............................. 62/91; 62/305; 62/314
(58) Field of Search ................................ 62/305, 259.4, 62/314, 503, 506, 91

(56) References Cited

U.S. PATENT DOCUMENTS

| | | | |
|---|---|---|---|
| 1,893,366 A | * 1/1933 | Harding | 62/305 |
| 2,179,632 A | 11/1939 | Hulse | |
| 2,228,484 A | * 1/1941 | Ramsaur et al. | 62/310 |
| 2,493,141 A | 1/1950 | Henney | |
| 2,696,085 A | 12/1954 | Ruff | |
| 2,802,342 A | 8/1957 | Gray | |
| 3,099,915 A | * 8/1963 | Anderson | 62/305 |
| 4,069,687 A | 1/1978 | Larriva | |
| 4,151,046 A | * 4/1979 | Eidelberg | 159/904 |
| 4,182,131 A | 1/1980 | Marshall | |
| 4,187,690 A | * 2/1980 | Lindahl | 62/138 |
| 4,194,371 A | * 3/1980 | Morse | 62/503 |
| 4,201,062 A | * 5/1980 | Martinez, Jr. | 62/117 |
| 4,250,717 A | 2/1981 | Stone | |
| 4,273,733 A | * 6/1981 | Kals | 261/151 |
| 4,448,347 A | * 5/1984 | Dunstan | 237/2 B |
| 4,676,071 A | 6/1987 | Latimer | |
| 4,964,279 A | * 10/1990 | Osborne | 62/201 |
| 4,974,422 A | * 12/1990 | Kocher | 62/305 |
| 5,032,230 A | * 7/1991 | Shepherd | 126/360.2 |
| 5,106,543 A | * 4/1992 | Dodds | 137/244 |
| 5,273,687 A | * 12/1993 | Osborne | 261/111 |
| 5,349,829 A | * 9/1994 | Tsimerman | 62/314 |
| 5,411,078 A | * 5/1995 | Ares | 62/305 |
| 5,494,424 A | 2/1996 | Schnell | |
| 5,501,269 A | 3/1996 | Jenkins | |
| 5,832,739 A | 11/1998 | Bacchus | |
| 6,070,423 A | 6/2000 | Hebert | |
| 6,097,778 A | * 8/2000 | Cheung | 376/282 |
| 6,102,683 A | 8/2000 | Kirsten | |
| 6,418,728 B1 | * 7/2002 | Monroe | 62/3.2 |

FOREIGN PATENT DOCUMENTS

GB 2240163 A * 7/1991 ............. F24D/3/18

* cited by examiner

*Primary Examiner*—William E. Tapolcai
*Assistant Examiner*—Mohammad M. Ali
(74) *Attorney, Agent, or Firm*—Crutsinger & Booth

(57) ABSTRACT

An air conditioner having a compressor, refrigerant condenser coil and accumulator submerged in water in a water tank, wherein the water is cooled by evaporative cooling when air is drawn through water sprayed into an air inlet duct communicating with the water tank. The compressor is cooled by the water in the water tank which is cooled by evaporative cooling. The water level in the water tank is maintained by a float valve connected to a water line to replenish evaporating water.

20 Claims, 2 Drawing Sheets

WATER COOLED AIR CONDITIONER

TECHNICAL FIELD

An air conditioner having a compressor, condenser coil and accumulator submerged in a body of water in a water tank, wherein the water is cooled by evaporative cooling when air is circulated through a mist of water sprayed into a water evaporation chamber communicating with an air inlet into the water tank and through an air manifold in the tank.

BACKGROUND OF INVENTION

Vapor compression systems are employed in most refrigerated air conditioning systems. Cooling is accomplished by evaporation of a liquid refrigerant under reduced pressure and temperature. The refrigerant vapor enters the compressor where the temperature is elevated by mechanical compression. The vapor condenses at this pressure in a condenser coil, if sufficient heat is dissipated. The high-pressure liquid refrigerant then passes through an expansion valve where the fluid pressure is reduced. The low-pressure refrigerant enters the evaporator where it evaporates by absorbing heat from the refrigerated space, and reenters the compressor.

Most residential central air conditioning units are split systems comprising a condensing coil, a refrigerant compressor and a fan located outside the home, and an expansion valve and a refrigerant evaporator coil that is usually part of a furnace or air handler inside the home. The air handler of the furnace blows air across the evaporator coil, which cools the air. The cool air is routed through a series of air ducts into space in the home to be cooled.

The compressor, usually controlled by a thermostat, acts as a pump that moves the refrigerant from the indoor evaporator to the outdoor condenser and back to the evaporator again, causing the refrigerant to flow through the system. It draws in a low-pressure, low-temperature, refrigerant in a gaseous state and by compressing this gas, raises the pressure and temperature of the refrigerant. This high-pressure, high-temperature gas then flows to a condenser.

The condenser normally located outside the home, is a device that transfers unwanted heat out of a refrigeration system. The condenser coil is usually formed by a series or network of aluminum-finned copper tubes filled with refrigerant that removes heat from the hot, gaseous refrigerant so that the refrigerant becomes liquid again.

The evaporator coil is a series of piping connected to a furnace or air handler that blows indoor air across the evaporator coil, causing the evaporator coil to absorb heat from the air. The cooled air is then delivered to the home through ducting. The refrigerant from the evaporator coil flows through an accumulator back to the compressor where the cycle is repeated.

The cooling capacity of the air conditioner is a measure of the ability of a unit to remove heat from an enclosed space. A long felt need exists for a condensing unit that efficiently removes heat from the system under a variety of operating conditions.

There are three types of condensers: air-cooled condensers, water-cooled condensers, and evaporative condensers. Most residential systems have an air-cooled condenser.

A fan typically draws outside air across the condenser coil of an air-cooled condenser. As the refrigerant passes through the condenser coil and the cooler outside air passes across the coil, the air absorbs heat from the refrigerant which causes the refrigerant to condense from a gas to a liquid state. The high-pressure, high-temperature liquid then reaches the expansion valve. The liquid flows through a very small orifice in the expansion valve, which causes the refrigerant to expand to a low-pressure, low-temperature gas that flows to the evaporator.

In hot regions of the country, the low temperature gradient between hot ambient air moving across the condenser coil and the hot refrigerant vapor flowing through the condenser coil prevent dissipation of enough heat which causes the system to operate at less than optimum efficiency. The compressor in the inadequately cooled system draws excessive electrical current, wasting electricity and increasing the operating cost of the system. Further, the cooling capacity of the system is often inadequate to maintain the desired temperature in an enclosed space.

An evaporative condenser uses a combination of air and water for condensing the refrigerant.

U.S. Pat. No. 5,832,739 discloses an air conditioner operating on a compressor-condenser-evaporator circuit that utilizes water cooled by air flowing over an evaporative medium through which the water flows to cool a condenser coil located in a continuous serpentine channel in a sump located at the lower side of the air conditioner unit. The condenser coils include offset intertwined upright coils that provide a large heat exchange surface with water flowing in the channel to a pump intake region of the sump. A pump is provided to supply the evaporative medium with water from the pump intake region of the sump for continuous circulation through the evaporative medium and the sump channel. A water distributor system supplies water uniformly to the top area of the evaporative medium by creating a film of water that is evenly distributed across the top of the evaporative medium. A raised area of the sump provides access to the interior of the evaporative medium without the need for a water sealing arrangement and a central platform supports the refrigerant compressor, pump and other accessories above the sump channel.

Water-cooled condensers transfer heat to water which is usually circulated through a remotely located cooling tower to remove heat.

U.S. Pat. No. 2,179,632 discloses a condenser tank containing water in which a condenser coil is submerged.

U.S. Pat. No. 2,493,141 discloses a super heat removing coil, receiver tank and pre-cooling coil immersed in water in a sump. The patent states that the compressor and a prime mover may be suspended from beneath a car in a housing or casing separate from that forming the cabinet.

U.S. Pat. No. 2,696,085 discloses a hot water heater having a motor compressor unit which supplies super heated refrigerant to a coil, both being submerged in water in the hot water heater storage tank. Refrigerant from the coil is delivered through additional coils, also submerged in water in the storage tank to an expansion valve, an evaporator and back to the compressor.

U.S. Pat. No. 2,802,342 discloses a heat pump which includes a compressor mounted within a casing containing oil and the casing is immersed in water in a tank. The patent states that in operation the gaseous refrigerant from the compressor passes to the condenser, where it gives up its heat to the water in the tank, and then flows to a liquid receiver from which it passes through an expansion valve to evaporator coils.

U.S. Pat. No. 4,250,717 discloses apparatus for utilizing waste water from an ice maker to cool the motor-compressor and associated coil of condenser tubing in that system. The apparatus features a motor-compressor around which is wrapped the condenser coil. The motor-compressor and condenser coil are contained within a water tank to which is directed waste water that has been collected from the meltdown of an ice making cycle or the condensate from a refrigerant evaporator. In applications where waste water production is insufficient a valve controlled supply of fresh water can be substituted therefor or used in conjunction with the waste water to effect cooling of both the compressor and condenser coils. The waste water in the tank will rise to the level of an overflow outlet at which point water will drain out of the tank.

U.S. Pat. Nos. 6,260,373 and 6,260,374 disclose water-source heat pumps, which typically include a compressor that compresses and circulates refrigerant in series-flow through two heat exchangers and an expansion valve. One heat exchanger transfers heat between the refrigerant and an external source of ground water. The other heat exchanger transfers heat between the refrigerant and a comfort zone, such as a room or other area within a building. Often a four-way valve determines whether the heat pump heats or cools the comfort zone by selectively directing the refrigerant flow in a forward or reverse direction.

If cooling is called for, the thermostat of a water source heat pump activates the centrifugal blower and sets the reversing valve into the cooling position. High temperature refrigerant vapor is pumped from the compressor through the reversing valve to a refrigerant-to-water heat exchanger. The refrigerant vapor condenses to a liquid as it passes through the heat exchanger, giving up its heat to the circulating water loop. High pressure liquid refrigerant then passes through the expansion device into the refrigerant-to-air fin tube coil heat exchanger. As the low pressure refrigerant passes through the coil, it evaporates to become a low temperature vapor, absorbing heat from the air, which is drawn over the coil by the blower. The refrigerant then flows as a low pressure gas through the reversing valve back to the suction side of the compressor where the cycle begins again.

The prior art devices are complicated, expensive to build and operate, and use excessive electricity. An affordable method and apparatus for extracting heat from refrigerant in residential air conditioning systems, while conserving energy, is needed.

SUMMARY OF INVENTION

The air conditioning system disclosed herein generally comprises four main components including a compressor, a condenser, an expansion valve and an evaporator, the heat generated in the refrigerant compressor being transferred to water that in cooled by evaporative cooling.

A scroll compressor delivers coolant at high pressure and high temperature through a condenser coil, through a high pressure refrigerant supply line, and an expansion valve and an evaporator coil. Coolant at low pressure and low temperature is delivered through a refrigerant return line and a liquid accumulator to the suction inlet of the compressor.

A water pump delivers a portion of the water from the water tank through a water line to one or more sprinkler heads which spray water into an air inlet duct. A fan draws air into the inlet duct where it passes through the water dispensed from the spray heads, which results in evaporation of the water and cooling of air delivered through the inlet duct into the water tank. Air is exhausted from the water tank through an exhaust duct. The water level of water in the tank is maintained by delivering water through a float valve connected to a water supply.

The compressor, the condenser coil and the accumulator are submerged in a body of water wherein the temperature of water is controlled by evaporative cooling. It should be noted that it does not discharge cooling water into a drain.

High energy costs are compelling air conditioner manufacturers to develop more efficient systems. The air conditioning system disclosed herein does not require inordinate heat exchanger size or new compressor technology to significantly reduce energy costs. Further, the system does not require the discharge of waste water and thus conserves resources.

High energy costs are compelling air conditioner manufacturers to develop more efficient systems. The air conditioning system disclosed herein does not require inordinate heat exchanger size or new compressor technology to significantly reduce energy costs, while improving the efficiency of the system and the ability of the system to cool the comfort zone in a building. Further, the system does not require a remote cooling tower or other sources of a large volume of water. The system does not discharge waste water and thus conserves resources.

DESCRIPTION OF THE DRAWINGS

Drawings of a preferred embodiment of the invention are annexed hereto, so that the invention may be better and more fully understood, in which.

Numeral references are employed to designate like or corresponding parts throughout the various figures of the drawing.

DESCRIPTION OF A PREFERRED EMBODIMENT

Figure 1:
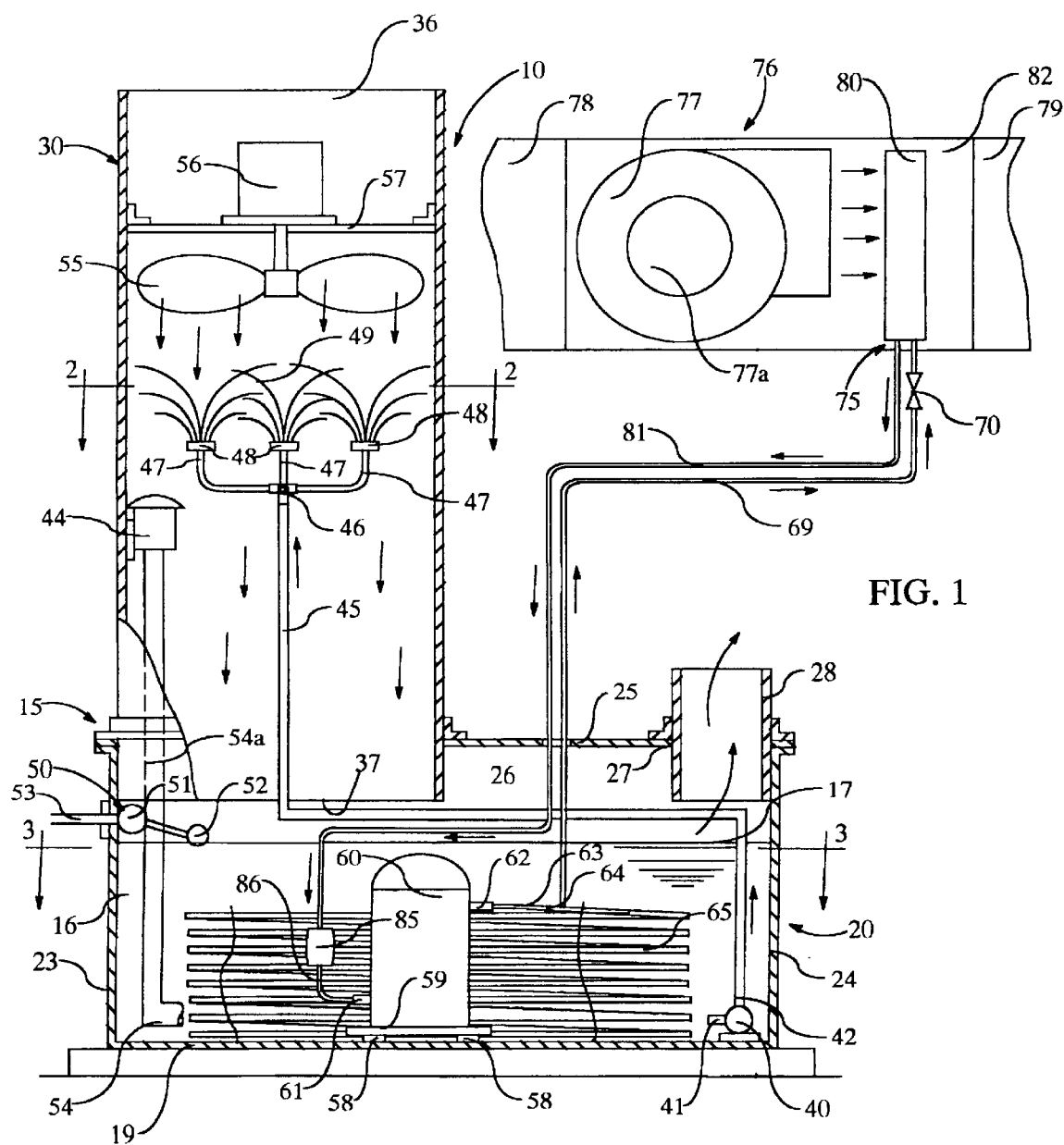
FIG. 1 is a diagrammatic cross-sectional view of the water cooled air conditioner.

Referring to FIG. 1 of the drawing, the numeral 10 generally designates a water cooled air conditioner comprising a refrigerant condenser unit 15 and a refrigerant evaporator unit 75.

In the illustrated embodiment, the water cooled air conditioner 10 is a split system for residential central air conditioning, the refrigerant condenser unit 15 being located outside the building and the refrigerant evaporator unit 75 being located in an air handling unit 76, as will be hereinafter more fully described, located inside the building. However, it should be readily apparent that the refrigerant condenser unit 15 and the refrigerant evaporator unit 75 may be mounted in a single cabinet, if it is deemed expedient to do so, and the system is suitable for use in non-residential environments.

Figure 3:
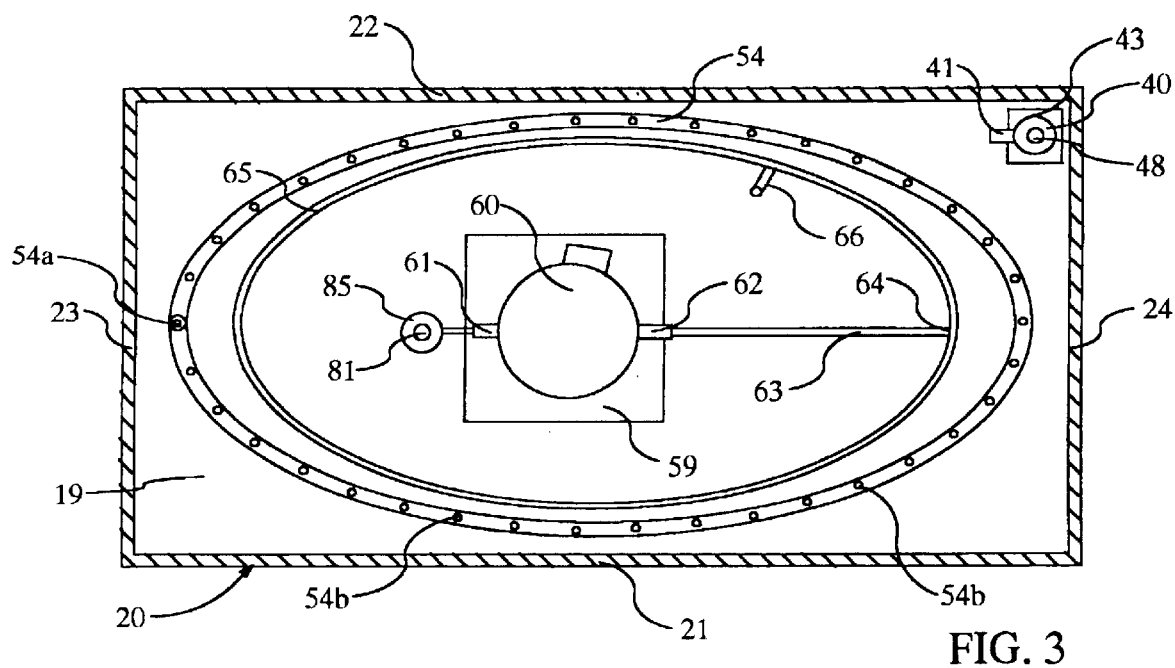
FIG. 3 is a cross-sectional view taken along line 3—3 of FIG. 1.

Referring to FIGS. 1 and 3 of the drawing, the refrigerant condenser unit 15 includes a water tank 20 and a water evaporation chamber 30. Water tank 20 comprises a front wall 21, rear wall 22, end walls 23 and 24, a water tank bottom 19 and a water tank cover 25. Water tank cover 25 has an air inlet opening 26 and an air outlet opening 27 formed therein. A water evaporation chamber 30 is formed in an air inlet duct extending through the air inlet opening 26 and an air outlet duct 28 extends through air outlet opening 27 in water tank top cover 25 through which air is exhausted from water tank 20.

Figure 2:
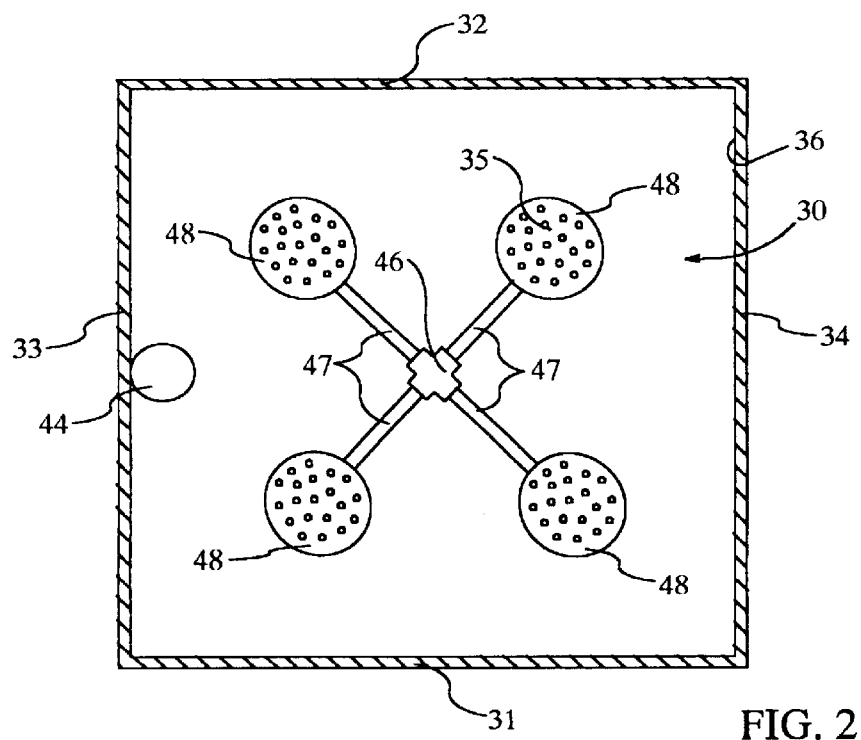
FIG. 2 is a cross-sectional view taken along line 2—2 of FIG. 1.

Referring to FIGS. 1 and 2 of the drawing, water evaporation chamber 30 is formed by a front wall 31, rear wall 32, and spaced end walls 33 and 34 secured to opposite ends of front wall 31 and rear wall 32. It should be readily apparent that front and rear walls 31 and 32 and end walls 33 and 34 form a hollow tube or duct having an upper air inlet opening 36 and a lower air outlet opening 37 formed in opposite ends thereof. The lower end of the tube extends through air inlet opening 26 in water tank top cover 25 through which air is delivered into water tank 20.

Referring to FIG. 1 of the drawing, a submersible water pump 40, having an inlet 41 and outlet 42, is secured by a suitable mounting 43 in water tank 20 which is at least partially filled with a volume of water 16 having an upper surface 17.

A water supply line 45 is connected between the outlet 42 of submersible pump 40 and connector 46. In the illustrated embodiment, connector 46 has an inlet opening connected to water supply line 45 and four outlet openings communicating with sprinkler risers 47. In the illustrated embodiment of FIG. 1, each sprinkler riser 47 is a curved tube having a generally L-shaped configuration, one end being connected to an outlet of connector 46 and the opposite end having a spray head 48 mounted thereon. Submersible pump 40 draws water from water tank 20 and delivers the water through water supply line 45, connector 46, sprinkler risers 47 and spray heads 48 for delivering an atomized mist 49 of water across the interior of water evaporation chamber 30.

Outside air is drawn by fan 55, which is driven by a motor 56 supported by a motor mount 57, through air inlet opening 36 and directed through the mist 49 of atomized water in water evaporation chamber 30. It should be readily apparent that air flow through the mist 49 of water will result in evaporation of the water, thereby cooling the air stream flowing through water evaporation chamber 30 and flowing downwardly across the upper surface 17 of the volume of water 16 in water tank 20. Excess water, not evaporated by the air stream, will be returned through water evaporation chamber 30 into water tank 20. Submersible water pump 40 is preferable positioned near the opposite end of the water tank 20 from the water evaporation chamber 30 to induce circulation of water through the water tank 20.

An air blower 44 is mounted in water evaporation chamber 30 and delivers cooled air through pipe 54a and a bubbler manifold ring 54 formed by a perforated tube submerged in water 16 in water tank 20. Air blower 44 is a mechanical device that produces a continuous rush of air to create the optimal bubbling effect by forcing air through holes 54b in bubbler manifold ring 54 to enhance the transfer of heat from the water 16 to the cooled air.

Referring to FIG. 1 of the drawing, the volume of water 16 in water tank 20 is replenished by water from a water line 53 connected to a float valve 50. Float valve 50 has a valve body 51 and water flowing therethrough is controlled by a float ball 52 which actuates a valve in valve body 51 in a manner well known to persons skilled in the art.

Referring to FIGS. 1 and 3 of the drawing, a refrigerant compressor 60, having a suction connector 61 and a discharge connector 62 has a mounting plate 59 mounted on resilient grommets 58 to the bottom 19 of water tank 20 such that compressor 60 is submerged in the volume of water 16 in water tank 20.

Refrigerant compressor 60 is preferably a scroll compressor which includes a generally cylindrical hermetic shell having a cap welded onto the upper end and a base mounting plate 59 at the lower end having a plurality of mounting feet (not shown) integrally formed therewith. The cap is provided with a refrigerant discharge connector 62 which may have the usual discharge valve therein. Only two components, a fixed scroll and orbiting scroll (not shown), are required to compress refrigerant gas in a scroll compressor.

The discharge connector 62 of compressor 60 delivers refrigerant through a compressor discharge line 63 to the inlet 64 of a refrigerant condenser coil 65, having an outlet 66 for delivering refrigerant through refrigerant supply line 69 to a refrigerant evaporator unit 75, as illustrated in FIG. 1. As best illustrated in FIG. 3 of the drawing, refrigerant condenser coil 65 is a generally elliptical shaped coil of copper tubing which is submerged in the volume of water 16 in water tank 20 and which encircles compressor 60. Unwanted heat from the hot; gaseous refrigerant is transferred out of the refrigeration system to the volume of cooled water 16 in water tank 20.

Refrigerant evaporator 75 is of conventional design and comprises a refrigerant expansion valve 70 and a refrigerant evaporator coil 80 mounted in an air handling unit 76. In the illustrated embodiment, air handling unit 76 comprises a blower 77 driven by a motor 77a mounted in a cabinet having a return air opening 78 and plenum 82 communicating with air supply ducts 79. Refrigerant from refrigerant evaporator coil 80 is delivered through refrigerant return line 81 to an accumulator 85 connected through tube 86 to the suction connector 61 of refrigerant compressor 60. The accumulator 85 is on the suction side of the system located between the output of the refrigerant evaporator 75 and the inlet connector 61 of the refrigerant compressor 60. The accumulator 85 has a stand pipe in it that functions by not allowing flow of liquid refrigerant to the compressor 60.

As herein before explained and as best illustrated in FIGS. 1 and 3 of the drawing, refrigerant compressor 60, refrigerant condenser coil 65 and accumulator 85 are submerged in the volume of cooled water 16 in water tank 20.

A portion of the volume of water 16 is drawn by submersible pump 40 from water tank 20 and dispensed through spray heads 48. Air delivered by fan 55 through mist 49 evaporates at least a portion of the mist 49 which results in cooling of the air stream and water droplets which fall back into water tank 20. The air stream cooled by evaporation of water flows across the upper surface 17 of the volume of water 16, thereby cooling the volume of water 16 in which compressor 60, refrigerant condenser coil 65 and accumulator 85 are immersed.

Heat is transferred from compressor 60 and refrigerant condenser coil 65 to the volume of water 16 in water tank 20. Heat is also transferred between accumulator 65 and the volume of water 16 in water tank 20.

The discharge line 63 from compressor 60 to refrigerant condenser coil 65 should be hot as a result of the compression of the refrigerant. Heat is transferred from the refrigerant in the refrigerant condenser coil 65 to the volume of water 16 in tank 20 which cools the refrigerant from a high-pressure gas and condenses it to a high-pressure liquid. The liquid refrigerant supply line 69 from the refrigerant condenser coil 65 to the expansion valve 70 should be warm. The refrigerant evaporator coil 80 should be cold because of the refrigerant evaporating in it. The suction line 81 from the refrigerant evaporator coil 80 to the accumulator 22 should be cold.

By way of explanation and not limitation, water tank 20 is preferably formed of galvanized sheet metal and is for example about four feet long, two feet wide and two feet deep. If water tank 20 is half filled with water it will contain approximately eight cubic feet of water. Since one cubic foot of water at 62° F. (16.7° C.) weighs approximately 62.3 pounds and one gallon of water weighs about 8.33 pounds, a volume of about 7.5 gallons of water occupies about one cubic foot. Water tank 20 contains about 60 gallons of water, if it is half filled to leave an air space above the surface 17 of water 16.

In the illustrated embodiment, water evaporation chamber 30 is approximately two feet by two feet and has a length or height of about four feet. The refrigerant condenser coil 65 is preferably a smooth surfaced coil formed by about 130 feet of ⅜ inch copper tubing to provide sufficient surface area for the transfer of heat from the refrigerant to the volume of water 16. It should be readily apparent that water tank 20 may be a molded plastic tub and at least partially submerged in the ground. The dimensions of the tank specified herein are for illustration purposes of a preferred embodiment and the invention is not limited to the illustrative size, capacity and material.

Terms such as "left," "right," "horizontal," "vertical," "up" and "down," when used in reference to the drawings, generally refer to the orientation of the parts in the illustrated embodiment and not necessarily during use. These terms used herein are meant only to refer to relative positions and/or orientations, for convenience, and are not to be understood to be in any manner otherwise limiting.

The refrigerant compressor 60, preferably controlled by a thermostat (not shown), is the "heart" of the system. The compressor 60 acts as the pump, causing the refrigerant to flow through the system. It draws in a low-pressure, low-temperature, refrigerant in a gaseous state and by compressing this gas, raises the pressure and temperature of the refrigerant. A significant portion of the heat, resulting from compression of the refrigerant in the compressor 60, is transferred directly to water 16 in water tank 20 before the high-pressure, high-temperature gas flows to the refrigerant condenser coil 65.

Fan 55 draws outside air through the mist 49 in evaporation chamber 30 for cooling the air stream and water 16 by delivering bubbles formed by manifold 54 through the water and a stream of cooled air across the surface 17 of water 16 in with refrigerant compressor 60, condenser coil 65 and accumulator 85 are submerged. As the refrigerant passes through the refrigerant condenser coil 65 the cooling water 16 absorbs heat from the refrigerant which causes the refrigerant to condense from a gas to a liquid state. The high-pressure, high-temperature liquid refrigerant then flows through refrigerant supply line 69 to the expansion valve 70.

The expansion valve 70 is the "brains" of the system. By sensing the temperature of the refrigerant evaporator cooling coil 80, it allows liquid to pass through a very small orifice, which causes the refrigerant to expand to a low-pressure, low-temperature gas. This "cold" refrigerant flows to the refrigerant evaporator 80.

The refrigerant evaporator coil 80 is a series of piping connected to a furnace or air handler 76 that blows indoor air across it, causing the refrigerant in the coil 80 to absorb heat from the circulating air drawn by blower 77 through the air return duct 78. The cooled air is then delivered to the house through supply air ducts 79 or air registers. The refrigerant then flows back to the compressor 60, through refrigerant return line 81 and accumulator 85, where the cycle starts over.

The method for extracting heat from an air conditioning system, hereinbefore described, comprises compressing refrigerant vapor in refrigerant compressor 60 for increasing the pressure and temperature of the refrigerant vapor. Thus, the compressor 60, the source of heat in the system, is at least partially submerging in water in water tank 20 and is in heat transfer relation with the water which is a better conductor of heat than air.

Spraying water into the water evaporation chamber for atomizing water in the water evaporation chamber maximizes the evaporation rate of the water and evaporative cooling of the air while returning water droplets entrained in a stream of air from the water evaporation chamber to the water tank.

While the above detailed description describes a preferred embodiment and best mode of the invention, it should be understood that the present invention is susceptible to modification, variation and alteration without deviating from the scope and fair meaning of the claims.

Having described the invention, what is desired to be secured for Letters Patent is set forth in the following claims:

1. A method for extracting heat from an air conditioning system comprising the steps of:

at least partially submerging a refrigerant compressor and refrigerant condenser coil in water in a water tank;

circulating water through the water tank and through a water evaporation chamber;

circulating air through the water evaporation chamber and the water tank such that water is evaporated in the water evaporation chamber for cooling the air and water circulated through the water tank for absorbing heat from the refrigerant compressor and refrigerant condenser coil.

2. A method for extracting heat from an air conditioning system according to claim 1, the step of circulating water through the water tank and through a water evaporation chamber comprising the steps of:

circulating water from the water tank to the water evaporation chamber;

atomizing water in the water evaporation chamber; and returning water from the water evaporation chamber to the water tank.

3. A method for extracting heat from an air conditioning system according to claim 2, the step of atomizing water in the water evaporation chamber comprising:

spraying water into the water evaporation chamber.

4. A method for extracting heat from an air conditioning system according to claim 3, the step of spraying water into the water evaporation chamber comprising:

delivering water through a plurality of orifices into the water evaporation chamber.

5. A method for extracting heat from an air conditioning system according to claim 3, the step of returning water from the water evaporation chamber to the water tank comprising:

allowing the water sprayed into the water evaporation chamber to cascade into the water tank.

6. A method for extracting heat from an air conditioning system according to claim 1, with the addition of:

circulating air from the water evaporation chamber through a perforated tube in the water tank such that bubbles of air cooled in the water evaporation chamber move through the volume of water for cooling the water.

7. A method for extracting heat from an air conditioning system comprising the steps of:

compressing refrigerant vapor in a refrigerant compressor for increasing the pressure and temperature of the refrigerant vapor;

at least partially submerging the refrigerant compressor in water in a water tank;

circulating water through a water evaporation chamber;

circulating air through the water evaporation chamber and the water tank such that water is evaporated in the water evaporation chamber for cooling the air and water in the water tank for absorbing heat from the refrigerant compressor.

8. A method for extracting heat from an air conditioning system according to claim 7, with the addition of:

circulating air from the water evaporation chamber through a perforated tube in the water tank such that bubbles of air cooled in the water evaporation chamber move through the volume of water for cooling the water.

9. A method for extracting heat from an air conditioning system according to claim 7, the step of circulating water through a water evaporation chamber comprising the steps of:

circulating water from the water tank to the water evaporation chamber;

spraying water into the water evaporation chamber for atomizing water in the water evaporation chamber; and returning water droplets entrained in a stream of air from the water evaporation chamber to the water tank.

10. Apparatus for extracting heat from an air conditioning system comprising:

a water tank and a water evaporation chamber in a condenser unit, said water tank being configured to receive a volume of water;

a fan configured to deliver air through said water evaporation chamber into said water tank;

a refrigerant compressor at least partially submerged in the volume of water in said water tank; and a water pump for circulating water through the water tank and through said water evaporation chamber, such that water is evaporated in the water evaporation chamber for cooling the air and water circulated through the water tank for absorbing heat from the refrigerant compressor.

11. Apparatus for extracting heat from an air conditioning system according to claim 10, with the addition of:

a spray head for receiving water from said water pump and for atomizing the water in the evaporation chamber.

12. Apparatus for extracting heat from an air conditioning system according to claim 10, with the addition of:

a plurality of spray heads connecting for receiving water from said water pump and for atomizing the water in the water evaporation chamber.

13. Apparatus for extracting heat from an air conditioning system according to claim 10, with the addition of:

atomizing means in said water evaporation chamber for receiving water from said water pump and for forming a mist of water droplets in the water evaporation chamber.

14. Apparatus for extracting heat from an air conditioning system according to claim 13, said atomizing means in said water evaporation chamber for receiving water from said water pump and for forming a mist of water droplets in the water evaporation chamber being configured for allowing the water sprayed into the water evaporation chamber to cascade into the water tank.

15. Apparatus for extracting heat from an air conditioning system according to claim 10, with the addition of:

a refrigerant condenser coil connected to said refrigerant compressor, said refrigerant condenser coil being at least partially submerged in the volume of water in said water tank.

16. Apparatus for extracting heat from an air conditioning system according to claim 10, with the addition of:

a refrigerant accumulator connected to said refrigerant compressor, said refrigerant accumulator being at least partially submerged in the volume of water in said water tank.

17. Apparatus for extracting heat from an air conditioning system according to claim 10, with the addition of:

an air manifold in said water tank; and a blower mounted to draw cool air from said water evaporation chamber and deliver the cool air through said air manifold for forming air bubbles in the water in said water tank to enhance transfer of heat for cooling the water.

18. Apparatus for extracting heat from an air conditioning system according to claim 13, with the addition of:

an air manifold in said water tank; and a blower mounted to draw cool air from said water evaporation chamber and deliver the cool air through said air manifold for forming air bubbles in the water in said water tank to enhance transfer of heat for cooling the water.

19. Apparatus for extracting heat from an air conditioning system according to claim 18, with the addition of:

a refrigerant condenser coil connected to said refrigerant compressor, said refrigerant condenser coil being at least partially submerged in the volume of water in said water tank.

20. Apparatus for extracting heat from an air conditioning system according to claim 19, with the addition of:

a refrigerant accumulator connected to said refrigerant compressor, said refrigerant accumulator being at least partially submerged in the volume of water in said water tank.

* * * * *